OPEN RING ANTENNA
Original Filed June 29, 1962 5 Sheets-Sheet 1
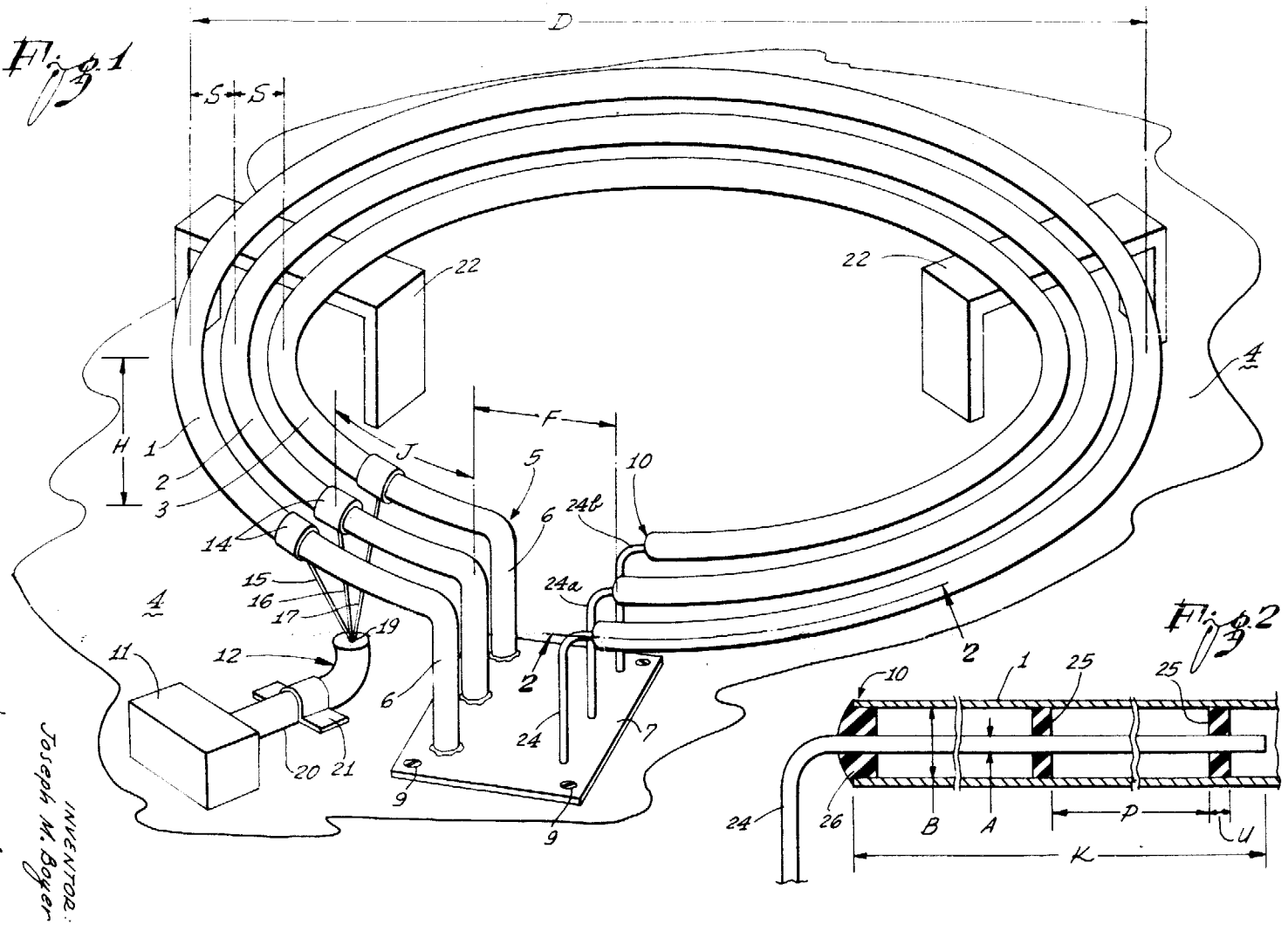

OPEN RING ANTENNA

Original Filed June 29, 1962 5 Sheets-Sheet 2

INVENTOR:
Joseph M. Boyer
By William M. Grolen
Agent

INVENTOR:
Joseph M. Boyer
By William M. Graham
Agent

OPEN RING ANTENNA

Original Filed June 29, 1962 5 Sheets-Sheet 4

INVENTOR:
Joseph M. Boyer
By William M. Graham
Agent

INVENTOR:
Joseph M. Boyer
By Willard M. Nelson
Agent

United States Patent Office

Re. 26,196
Reissued Apr. 25, 1967

26,196
OPEN RING ANTENNA

Joseph M. Boyer, Rolling Hills, Calif., assignor to Northrop Corporation, Beverly Hills, Calif., a corporation of California Original No. 3,151,328, dated Sept. 29, 1964, Ser. No. 206,248, June 29, 1962. Application for reissue Dec. 15, 1965, Ser. No. 526,326
22 Claims. (Cl. 343—742)

Matter enclosed in heavy brackets [ ] appears in the original patent but forms no part of this reissue specification; matter printed in italics indicates the additions made by reissue.

This invention relates to radio antennas, and *more* particularly to those used for the sending and reception of signals in the very low radio frequency portions of the spectrum extending from 10 kilocycles to 500 kilocycles, *for example.*

Since the inception of the radio art one of the most severe obstacles to the widespread use of the very low radio frequencies has been the inability to construct antennas of sufficient physical height to achieve natural resonance and efficiency. As an example, the shortest natural resonant vertical antenna over a conductive earth plane at a frequency of 10 kilocycles, would have to be 24,600 feet in height. Practitioners of the antenna art have therefore concentrated their efforts to devising ingenious means for bringing a cylindrical vertical radiator of feasible height to resonance by various forms of electrical loading. These efforts have resulted in two primary embodiments: one, which eliminates the negative reactance of the electrically short cylindrical vertical radiator by the insertion of a positive reactor, i.e., a coil, in series with the radiator; and a second, which includes a combination of means in which a large area of conductive elements is conductively joined to the top portion of the vertical radiator member to reduce the magnitude of negative reactance presented by the antenna circuit, and the remainder of such negative reactance removing by adding a positive reactor, or inductor, in series with the vertical radiator elements.

All such very low frequency antenna structures of the prior art suffer from the defect of presenting very low magnitudes of the real components of the input impedance to the radio apparatus and also produce large current magnitudes due to such low impedance. Because of the attendant need for the use of auxiliary impedance matching networks, as well as other difficulties, such antennas perform with low radiation efficiency, present great difficulties in tuning when changing frequency, and greatly restrict the rate of transmission of intelligence due to narrow bandwidth.

Also, in portions of the radio spectrum where the wavelength is much shorter than in the very low frequency ranges, certain difficulties are still found in mounting resonant antennas on mobile vehicles due to the vertical height necessary to achieve efficiency.

With these problems in mind, the principal object of the present invention is to provide an efficient, resonant antenna which achieves its electrical aperture in the azimuthal plane, is [vertically] *linearly* polarized, and eliminates the need for structures of [very] great physical height.

Another object of this invention is to provide an efficient antenna which incorporates means for [instantaneous] *rapid* tuning for use in frequency changes during operation.

Still another object of the invention is to provide an antenna structure having an intrinsic positive reactive component when out of tune, so that resonance may be achieved by means of low loss, negative reactors.

It is a further object of the invention to provide an antenna in which loading means [is] *can be* applied at a point of small current so that vexious power losses may be minimized.

A still further object of the invention is to provide an antenna having a variable range of real input impedance at resonance so that it may be efficiently connected directly to various types of radio apparatus or transmission lines without need for impedance matching networks.

Finally, it is an object of the present invention to provide an antenna which radiates a vertically polarized wave when mounted [parallel] *close* to the earth plane, with a distribution of radiated energy essentially the same as that produced by a full quarter-wavelength vertical radiator.

Briefly, my invention comprises one or more nearly closed ring conductive members positioned in a substantially horizontal plane, a first end of said members being electrically connected directly to a common conductive plane (real or simulated) *by a vertical leg member,* and the second end of said members preferably connected to the common conductive plane through capacitive tuning means. Radio energy is *preferably shunt* fed into or out of the antenna through a first connection near the first end of each of said *ring* members and a second connection at said conductive plane. Certain novel capacitive tuning structure is provided at the second ends. For use with a plurality of antenna ring members in one assembly, the tuning capacities are of different value to achieve wideband tuning, and the feed connections near the first ends of the members are at different points [thereon] *on the antenna* to adjust the impedance match.

Reference to the accompanying drawings will be made by way of illustration and not limitation, wherein:

FIGURE 1 is a perspective view of the present antenna, showing one embodiment thereof.

FIGURE 2 is a longitudinal section view of a portion of FIGURE 1, viewed as indicated by the broken line 2—2 in FIGURE 1, showing the internal structure of the tuning means.

Figure 3:
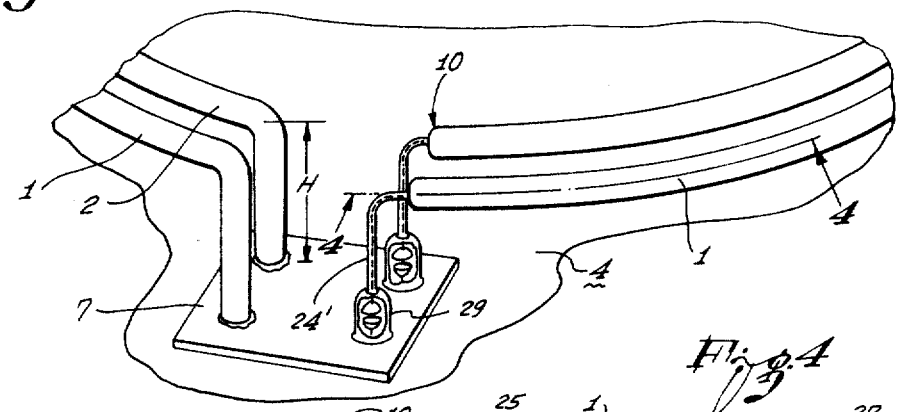
FIGURE 3 is a perspective view of a portion of the antenna of FIGURE 1, showing a modified tuning means.

For simplicity of description the case of a transmitting antenna is discussed in this specification, but it is to be understood that the electrical and other principles apply with equal force to a receiving antenna.

Referring first to FIGURE 1 for a detailed description of specific apparatus, a plurality of circular, hollow conductive ring members 1, 2, and 3 having an overall diameter D and a respective radial spacing S are disposed in a plane parallel to and at a height H over a second plane of good electrical conductivity 4. A first or near end 5 of each of said circular conductive members 1, 2, and 3 is bent down to form a leg 6 conductively joining a metal plate 7 which is in turn conductively joined to the conductive plane 4 as by screws 9, the other or far ends 10 of said ring members 1, 2 and 3 being spaced from the first ends by a short gap F disposed in the plane of the ring members. At a distance J from the legs 6 along the members 1, 2 and 3, energy from a radio apparatus 11 connected by a transmission line 12 is brought to the members 1, 2 and 3 by means of connecting collars 14 via separate down leads 15, 16, and 17 which *may* join conductively into a common point 19 at the inner conductive member of said transmission line 12, the outer conductive sheath 20 of transmission line 12 being conductively joined to the conductive plane 4 by means of a clamp 21.

Two non-conductive frames 22 support and preserve the parallel relationship of the ring members 1, 2 and 3 to the conductive plane 4. Referring both to FIGURES 1 and 2, I prefer in this embodiment of the invention to tune the antenna by means of a set of conductive tuning members 24, 24a, and 24b, said tuning members, as shown in FIGURE 2, being disposed concentric to the hollow conductive walls of members 1, 2 and 3 and insulated therefrom by means of non-conductive support beads 25 and a non-conductive end plug 26. The length of tuning member 24 contained within the interior of ring member 1 is designated by the dimension K. The outside diameter of tuning member 24 is designated as A, and the inside diameter of the ring members is designated as B. The thickness of each bead support 25 is designated as U and the spacing between these supports is designated as P. That portion of the tuning members 24, 24a, and 24b which emerges from the interior of the ring members 1, 2 and 3 through the non-conductive plug 26 is bent normal to the ring members and terminates conductively in common metal plate 7, and can serve as a support for this end of the antenna. The interior length K of the tuning member 24 thus forms a capacitance with the tubing wall of the ring members 1, 2 and 3.

I have found that there are preferred relationships between the dimensions disclosed in this specification, such preferred dimensions being applied to all embodiments shown in the drawings.

To make the preferred dimensions of the invention clear I find it convenient to refer all physical dimensions to the wavelength of the operating radio wave employed for communications with this antenna. In this respect $\lambda_1$ will refer to the longest wavelength [or], *at the* low frequency limit of tuning of the antenna, and $\lambda_2$, $\lambda_3$, . . . $\lambda_n$ refer to shorter waves contained within the tuning capability of the antenna invention.

Now for the vertical height H of the [antenna] *ring* members over the conductive plane 4, I prefer that the dimension H does not exceed 0.125 $\lambda_1$. It can be as low as .001$\lambda_n$, with an average operating value of about .007$\lambda$ at the middle of the actual tuning range of a particular antenna.

I prefer that the overall diameter D of the circular conductive members is not less than 0.01$\lambda_1$. It can be as much as .075$\lambda$ without seriously disturbing the omnidirectional radiation.

The spacing S between the circular conductive members 1, 2 and 3 I have found not to be critical, but need only be sufficient so that conductive contact with adjacent circular members is avoided under all stresses and movements of the antenna.

The dimension of gap F is selected from an engineering viewpoint on the basis of two factors: (1) mitigation of capacity effect between the far ends 10 of the ring members and the legs 6, and (2) prevention of high-voltage discharge across this gap F. The effect of the capacity at this point is to reduce or lower the high frequency end of the tuning band, while the possibilities of voltage breakdown must be considered only when large amounts of transmitted power are involved.

From measurements, I have found that for a good impedance match to the standardized coaxial cable impedance of 50 ohms, dimension J should be approximately equal to 0.0007 $\lambda_1$.

The characteristic impedance $Z_{oa}$ of a single circular conductive member 1, in conjunction with the conductive plane 4, is found to be $$Z_{oa}=138 \log_{10}\frac{4H}{M}$$

*where M is the diameter of the conductor of which ring member 1 is made.*

As the near end 5 of the single ring member 1 is terminated conductively into the conductive plane 4 through leg 6, there is a positive reactive magnitude $jX_a$ present between the far end 10 and the conductive plane 4 which is, *approximately,*

$$jX_a=Z_{oa} \tan \delta$$

where $\delta=(2\pi D/\lambda)$ 360 degrees.

To obtain the condition of resonance at the wave length for ring member 1, the reactance $jX_a$ must be tuned out in shunt by an equal but conjugate magnitude of reactance $-jX_a$. Thus, a necessary condition j $$|jXa|=|-jX_a|$$

and, for the embodiment of FIGURE 1, $-jX_a=Z_{oi} \cot \xi$ where $$Z_{oi}\frac{Z_{ob}}{\sqrt{1-(\epsilon_1/\epsilon-1)U/P}}$$

$Z_{ob}=138 \log_{10} B/A$, $\epsilon_1$ is the dielectric constant of the support bead 25, and $\epsilon$ equals *the dielectric constant of free space* [unity].

Then, $\xi=(K/\lambda)$ 360 degrees.

The relationships given for the dimensional magnitudes are sufficient for engineering design. Those skilled in the art will perceive that appeal to the methods of logarithmic potential theory will permit more accurate determination of the effects of the multiplicity of "n" number of ring members.

Referring to FIGURE 3, another embodiment of the tuning means is shown, and only two ring members 1 and 2 are shown for the purpose of clarity. The principles to be disclosed will, however, apply to any number. It will be clear to skilled practitioners that when the height H [of the antenna] is much less than 0.125$\lambda_1$, for extremely long wave-length bands, the magnitude of $Z_{oa}$ [will] *may* be small. Thus, the reactive magnitude $jX_a$ [will] *may* also be small. Under these conditions, the length K of the tuning member 24 of FIGURE 2 may exceed the circumference of the ring member 1. To avoid this difficulty the tuning member 24' is conductively joined at a distance $K_1$ (FIGURE 4) to the inner conductive wall of the ring member 1 by means of a conductive disc 27. This adds inductance to the far end 10 of the antenna. The non-conductive support beads 25 and the non-conductive end plug 26 are retained as in FIGURE 2. A total positive reactive magnitude $jX_t$ will now appear between the external extremity of conductive tuning member 24' and conductive plane 4 of $jX_t = jX_a + jX_c$, where $jX_c = Z_{oi} \tan \xi$.

Due to the greater total magnitude of positive reactance presented between the external extremity of tuning member 24' and the conductive plane 4 than in the embodiment of FIGURES 1 and 2, the antenna may be brought resonant by terminating the external extremity of tuning member 24' in one plate of a high voltage, air insulated or vacuum insulated capacitor 29 whose reactance at $\lambda_1$ is $-jX_t$. The other plate of capacitor 29 is connected to conductive plane 4 through the plate 7.

Figure 5:
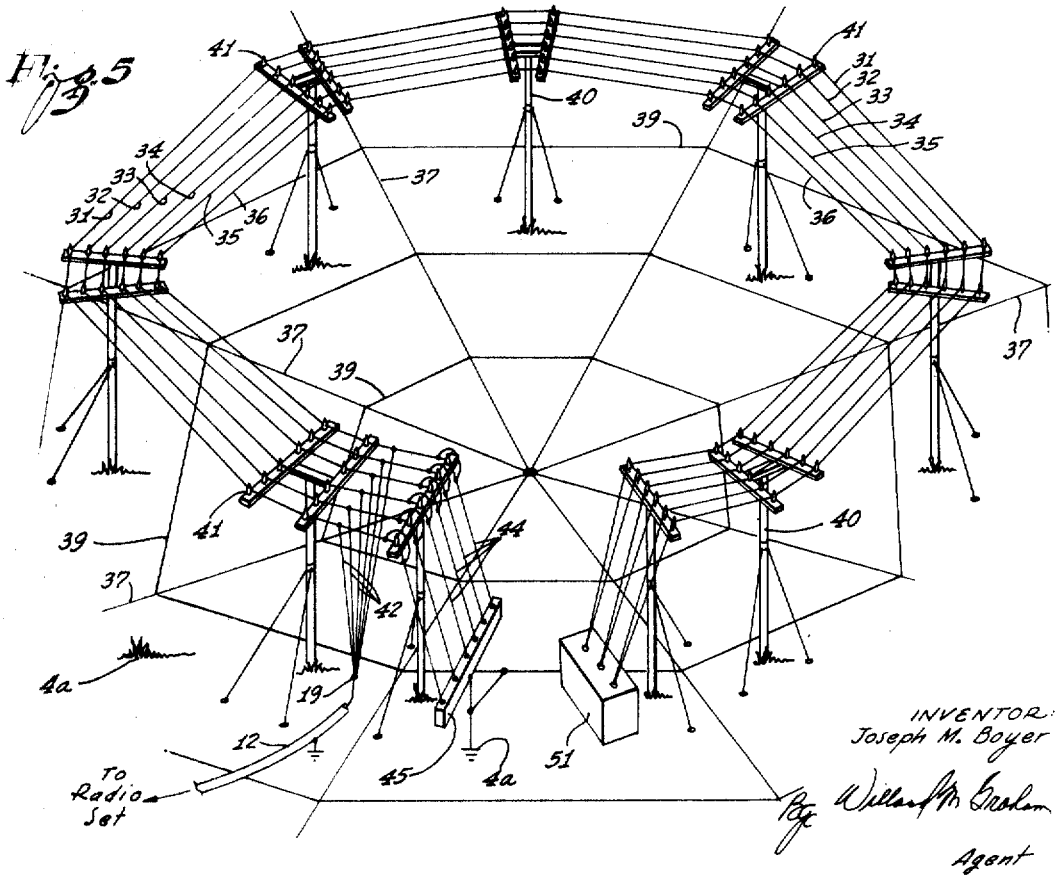
FIGURE 5 is a perspective view of a second embodiment of the invention, showing a large diameter antenna mounted over a plane formed of conductive members on the earth.

In FIGURE 5 is shown another embodiment of the invention, wherein solid conductive members such as wires or rods 31 through 36 are employed in place of the hollow tubular ring members 1, 2, and 3 of FIGURE 1. Such expedient is useful when the antenna is of large physical size, to avoid excessive cost and to reduce wind resistance. When, in such very low frequency structures, the invention is erected over the earth, the common conductive plane 4 is simulated by a radial configuration of conductive members in the form of soil wires 37 so disposed that the origin of the system of soil wires 37 is concentric with the origin of the plane containing the antenna wires 31–36. Those skilled in the art will see that, unlike the prior art antennas of the vertical cylindrical type, currents induced in the conductive simulated plane 4a FIGURE 5 will only be radial in direction within the soil at great distances from the antenna. Close in and under the system of elevated wires 31–36 of the disclosed embodiment, circumferential currents will be induced which must be collected by a system of bridging wires 39 which bridge the radially disposed soil wires 37.

Non-conductive poles or towers 40 are employed to support the elevated wire members, with insulators 31 used to avoid leakage of current to the pole structures. Height H and diameter D remain as given for FIGURE 1, in terms of operating wavelength. The cross sectional diameter M of the conductors, however, is much smaller than those of FIGURE 1. I prefer that the total radio frequency loss resistance of the elevated wire members 31–36 be less than 0.03 ohm. Thus, a typical system may employ 100 lines of number eight copper cable, although only six lines are shown in the drawing to avoid complexity. For each such wire 31–36, respectively, a down lead 42 [is employed to] conductively [joined] *joins* each such wire member to common junction point 19 at the inner conductive member of coaxial transmission line 12 which conveys energy from the radio apparatus. End conductors 44 from wires 31–36, respectively, connect through a conductive collecting bar 45 to the conductive simulated plane 4*a*.

Figure 6:
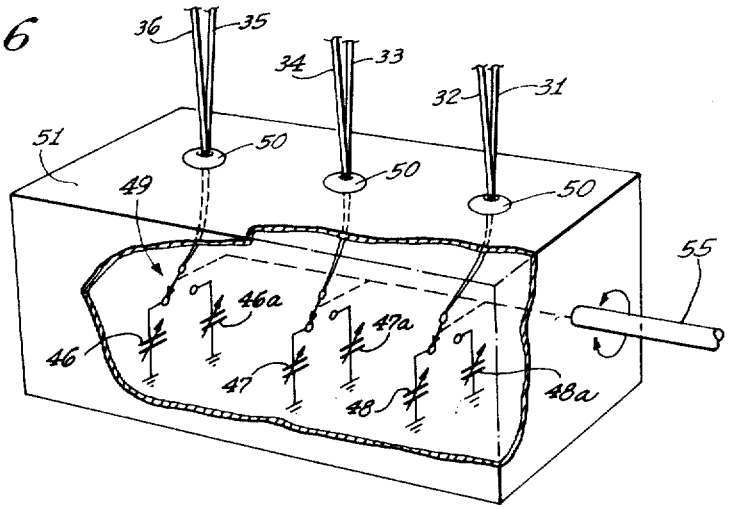
FIGURE 6 is a perspective cut-away showing on an enlarged scale the tuning means of FIGURE 5.
Figure 7:
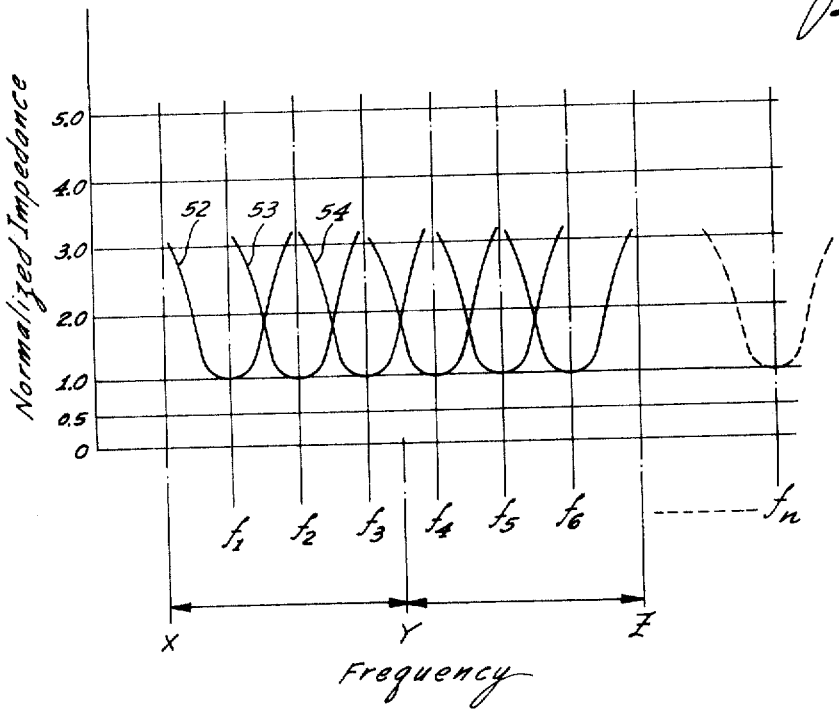
FIGURE 7 is a graph showing the overlapping variation of normalized input impedance versus frequency secured in the present invention.

The far extremities of the antenna wires 31–36 terminate in the insulated plate section of capacitors 46, 47, and 48, as shown in FIGURE 6, via individual blades of a ganged high voltage switch 49, the other plate section of said condensers 46–48 being electrically connected or grounded to the radial simulated conductive plane 4a. The principle of this embodiment of the invention will be made clear by reference to the six elevated wires 31–36 shown in FIGURES 5 and 6. As shown, each pair of the elevated wire members comes to a common junction at a respective feed-through insulator 50 which passes through the walls of a weather-resistant housing 51 containing the capacitors 46–48, and three-pole switch 49. Referring to FIGURE 7, the purpose of the pair grouping and multiplicity of capacitor means of the invention is illustrated. The wire pair 31 and 32, tuned to frequency $f_1$ by capacitor 48 causes the input impedance at the down lead junction point 19 to coaxial transmission line 12 to present a good impedance matching over a very narrow radio band centered around frequency $f_1$, as illustrated by first curve 52. For high signaling rates, the band width must be considerably wider than that obtainable by this single means. Therefore, the wire pair 33 and 34 in conjunction with capacitor 47 are adjusted by means of the reactive setting of the latter to present a good impedance match to the transmission line 12 at a slightly higher frequency band centered around frequency $f_2$, as illustrated by second curve 53. By employing the same procedure with successive wire pair 35 and 36 and capacitor means 46, illustrated by third curve 54 around frequency $f_3$, the invention permits obtaining a total radio pass band of width x–y as shown in FIGURE 7.

Sometimes it is vital in using such antenna systems to be able to quickly switch to a second frequency band, such as is done in using calling and working frequencies in the radio marine service. Thus, placing high voltage switch 49 in the second position by means of switch control shaft 55 so that another group of three capacitor means 46a, 47a, and 48a is respectively connected to wire pairs 31 and 32, 33 and 34, and 35 and 36, and suitably adjusting each of the second set of three capacitor means, permits instantaneous tuning to the pass band y–z, for example, shown in FIGURE 7. The paralleling of antenna wires into the pairs, as described, reduces the R.F. resistance of the antenna. Pass band y–z need not be immediately adjacent to band x–y.

Figure 10:
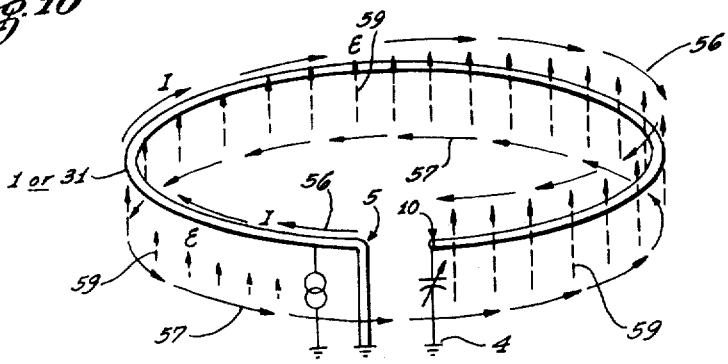
FIGURE 10 is a schematic diagram of the present antenna showing the voltage and current distribution thereon.

Now in the embodiments disclosed in this specification, those skilled in the antenna art will realize the difference between the artificially loaded antennas of the prior art and the present invention. For example, I prefer that the antenna ring members 1, 2, 3, or 31–36 be disposed so as to form a circle or a polygon whose number of sides exceeds four. Thus, superficially, my disclosed elevated means may resemble the multi-turn loop antenna of the prior art. Skilled practitioners, however, will note that currents 56 (FIGURE 10) flowing in the ring members of my invention will cause a horizontally polarized electric field component to be radiated, and they will also perceive that, due to the out-of-phase currents 57 induced in the conductive image plane 4, a second horizontally polarized field contribution will be radiated from this image source, cancelling all such horizontally polarized energy—thus seeming to render the disclosed antenna ineffective. By the selected means of feeding energy into the antenna [and its parallel disposition to the conductive plane 4], this effect is deliberately [introduced by the] *used in the present* invention. However, the elevated conductive members are selectively employed in this invention to form a circumferental aperture formed of the electric field lines 59 established normal to the conductive plane 4 as shown in FIGURE 10. [Thus, the invention establishes the equivalent of quasi-ring array of vertical electric elements 59 with a gradually increasing phase shift from one, grounded, extremity 5 of the elevated ring members 1 or 31 to the other, free, extremity 10.] *The bulk of the desired vertically polarized radiation occurs from the vertical posts or legs.*

Figure 4:
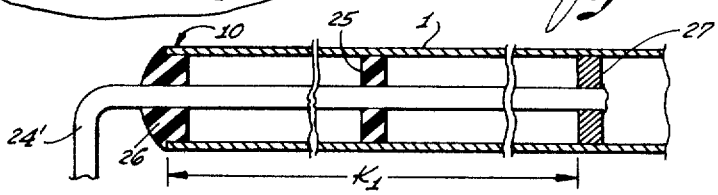
FIGURE 4 is a longitudinal section view viewed as indicated by the broken line 4—4 in FIGURE 3, showing internal details of the modified tuning means.

As previously stated, the ring members 1–3 and their alternates 31–36 form the circumferential geometry of a circle or polygon in a plane disposed parallel to conductive plane 4. Those skilled in the antenna art will thus see that I deliberately employ the higher order transmission modes established by such three dimensional geometry of the elevated conductive members and the conductive plane 4 for the radiative means rather than the normal TEM mode found in linear antisymmetric excitation transmission line systems. Finally, it will be noted that the invention herein disclosed does not constitute or serve as a simple elevated capacitor antenna of the prior art, for the boundary parameters of the present system force the propagation of a wave circumferentially along the perimeter of the elevated antenna *components* and the conductive plane 4. They will perceive that such propagated wave is composed of two components, one forming a standing wave system around the perimeter of the antenna and a second component of traveling wave which is present due to the radiation losses of the circumferential aperture. [Also, solution of the boundary problem will disclose to skilled practitioners the fact that Poynting's vector is tangential to the circular conductive elevated members and to the image in the plane 4.] Again, the [loading means in the form of the] concentric tuning members 24, 24a, and 24b of FIGURES 1 and 2 or the capacitors 46–48 of FIGURE 6 and the combination of such means 24' and 29 in FIGURES 3 and 4 are asymmetrically disposed in contrast to the symmetrical means of the prior art. Finally, no effort is made to utilize the central area of the elevated plane in the present antenna *as a solid conductive plate,* as is done in a conventional capacitor antenna, for to do so would destroy the electrical conditions necessary for the operation of the antenna invention disclosed herein.

Figure 8:
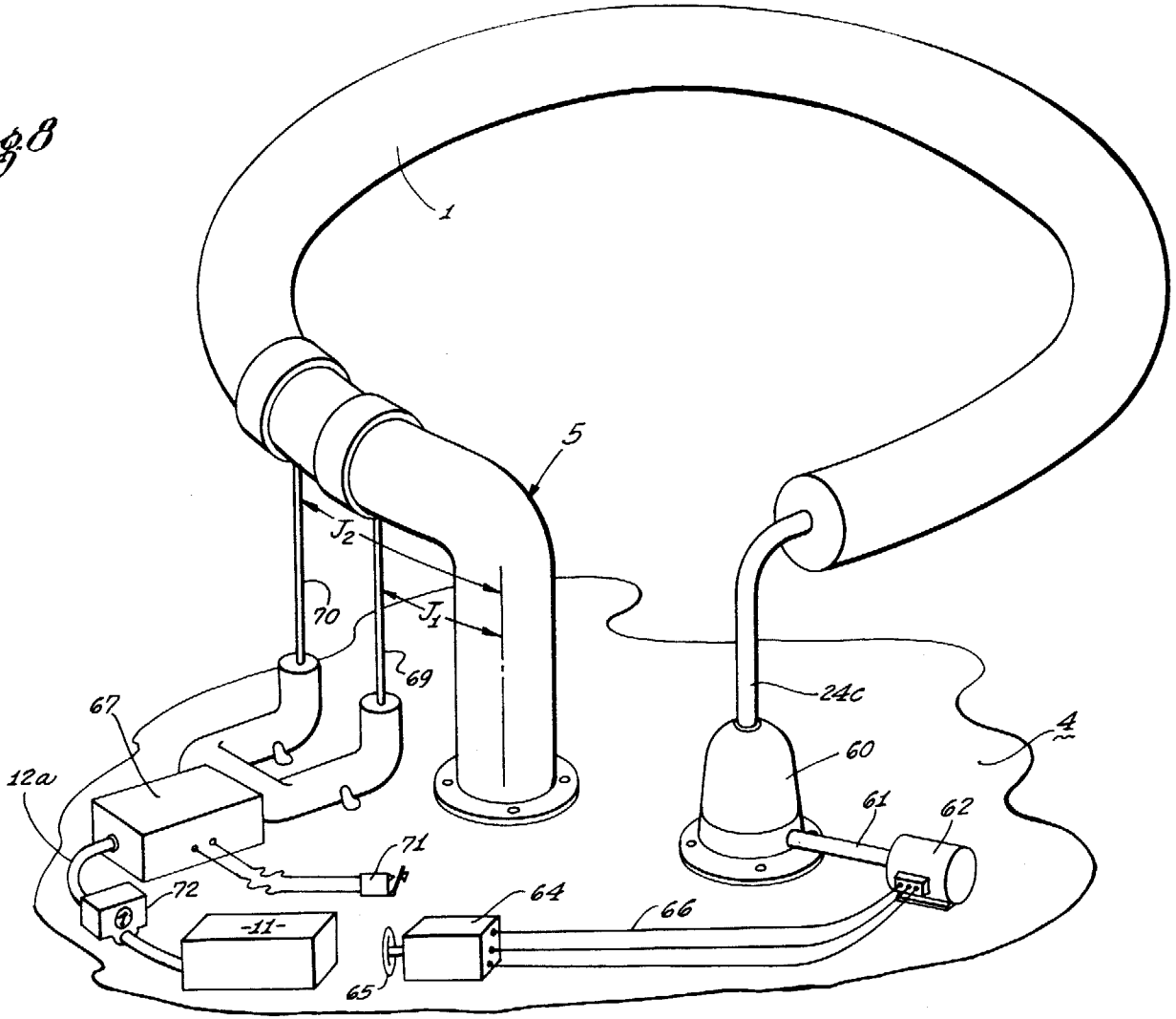
FIGURE 8 is a perspective view of the present antenna, showing a system of input switching and a variable tuning means.

Reference is made to FIGURE 8 where an embodiment is disclosed to achieve a continuous tuning coverage means. Although only one hollow conductive ring member 1 is shown for simplicity, the principle given applies for embodiments containing a multiplicity of such ring members. Here, the conductive tuning member 24c is disposed as in FIGURE 4, its far extremity terminating in a variable capacitor 60. The adjustment shaft 61 of such variable capacitor 60 is brought out of the capacitor housing parallel to the conductive plane 4 and is mechanically connected to the shaft of a servo motor 62. A servo transmitter instrument 64 whose shaft is provided with a setting knob 65 is located at a remote operating position together with the radio apparatus 11, and connected electrically to the servo-motor 62 by an electrical cable system 66, suitably energized by an alternating current source means (not shown), as is well known in the art. By turning the knob 65 at the remote position, the operator may thus adjust the magnitude of the negative reactance of the variable capacitor 60.

Near the antenna, transmission line 12a is provided with a coaxial switch 67 so that the transmitted energy of the radio set may be directed either to [down lead] *vertical leg* 69 or 70 located at different respective distances $J_1$ and $J_2$ from the first or near extremity 5 of hollow ring member 1. A switch control means 71 is located at the remote operating position for energizing the coaxial switch 67. In series with transmission line 12a near its junction with the radio apparatus 11, a reflection coefficient meter 72 is installed so that the operator may determine when the antenna is adjusted to a good impedance match to the line 12a. I have found that for tuning to frequencies within a 2:1 ratio, a single [down lead] *vertical leg* such as 69 at a position $J_1$ will preserve the impedance match so as not to exceed a reflection power loss of 11 percent. Over a greater tuning range, I prefer that an alternate [down lead] *vertical leg* 70 be provided at a different position $J_2$ along the ring member 1. By such remote continuous tuning means to variable capacitor 60 and use of the switching means 67 to [transmission down leads] *vertical legs* 69 and 70, operation may then be had [efficiently and rapidly] over a minimum of a 4:1 tuning frequency band.

Figure 9:
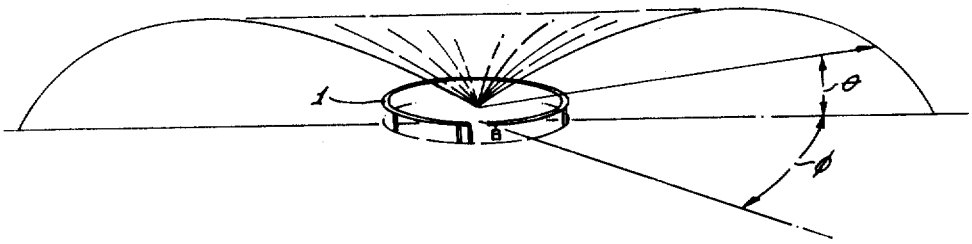
FIGURE 9 is a diagrammatic view showing the distribution of vertically polarized radiated power from the present antenna over the earth.

Due to propagation conditions and the usual location of communication stations on the surface of the earth, it is known that an efficient antenna should direct most of its radiated energy close to the horizon and also be essentially omnidirectional in the azimuth plane. FIGURE 9 shows the measured distribution of the radiant energy from the present antenna invention. Essentially the radiation function is that of the cosine of the elevation angle $\theta$, being maximum on the horizon, and is a constant in the azimuth plane $\phi$.

FIGURE 10 shows the measured current and voltage distribution of the present antenna invention, as mentioned before. The voltage difference E represented by the dashed electric field lines 59 between the ring members and the conductive plane 4 [is] *has* a minimum magnitude at the first extremity 5 of the ring members and rises to a maximum at the second extremity 10 of said ring members. The current I represented by arrows 56 in the elevated ring members is maximum in intensity at the first extremity, falling to a minimum at the second extremity, and is 180 electrical degrees out of phase with the image current 57 induced in the conductive plane 4.

It is thus seen from the above description that the antenna herein disclosed has wide application and usefulness and that considerable utility may be added by employment of the various features described, either singly or in combination. One of the more important features of the present antenna is its low height, which is stated previously, can be as little as .001 times the operating wavelength.

Figure 11:
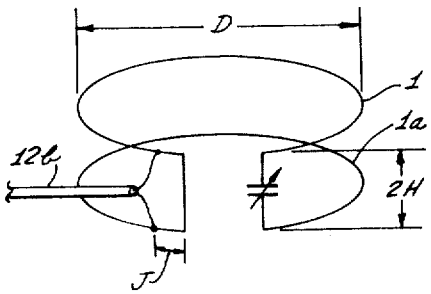
FIGURE 11 is a diagram illustrating a balanced version of the present antenna having two axially displaced open-ring members.

While there has been here described what is at present considered to be the preferred embodiments of the invention, it will be obvious to those skilled in the art that various changes and modifications may be made therein without departing from the principles of the invention. As an example, while I have only described embodiments of the invention of an unbalanced nature disposed over an image conductive plane, the invention may be freed from such restriction by merely replacing the said conductive plane with a mirror image disposition of the elevated elements, the vertical height dimension H now being converted to a magnitude 2H, such a configuration being illustrated in FIGURE 11 where the two conductors of a transmission line 12b are connected respectively to upper ring member or members 1 and to lower ring member or members 1a.

*Other modifications which may suggest themselves are the substitution of other tuning means rather than the shunt capacitor means 24 and 24', and different types of input connections, although it is preferred to use the shunt feed described and shown herein.*

While in order to comply with the statute, the invention has been described in language more or less specific as to structural features, it is to be understood that the invention is not limited to the specific features shown, but that the method and means herein disclosed comprise several forms of putting the invention into effect, and the invention is therefore claimed in any of its forms or modifications within the legitimate and valid scope of the appended claims.

I claim:

1. An antenna comprising a nearly closed conductive ring member, a first end of said ring having a conductive extension in the form of a leg joining said first end at substantially a right angle to the plane of said ring, means for connecting the outer end of said leg to one side of a transmission line, connecting means on said ring a short distance from said first end for attaching to the other side of the transmission line, and capacitance means having one side thereof connected to the second end of said ring, and conductive means connecting the other side of said capacitance means to said outer end of said leg.

2. Apparatus in accordance with claim 1 wherein said capacitance means has a predetermined value to tune said antenna resonant at a desired operating frequency, and wherein said short distance is predetermined to provide a correct impedance match to a transmission line.

3. Apparatus in accordance with claim 1 wherein said ring member is a hollow tubular structure, said capacitance means comprising a linear conductive tuning member supported coaxially within said second end of said ring by nonconducting means only, and extending a predetermined distance within said ring, said tuning member turning substantially in the said direction as said leg just outside said second ring end and extending for substantially the same length as said leg, and conductive means connecting said leg outer end to the outer end of said tuning member.

4. Apparatus in accordance with claim 1 wherein said ring member is a hollow tubular structure; said capacitance means comprising a linear conductive tuning member extending coaxially within said second end of said ring for a predetermined distance, non-conductive support means between said ring second end and said tuning member, a conductive support disc connecting the inner end, only, of said tuning member to the inner diameter of said ring, said tuning member turning substantially in the same direction as said leg just outside said second ring end, and a capacitor connected at one end to the outer end of said tuning member; and including conductive means connecting said leg outer end to the other end of said capacitor.

5. Antenna structure comprising a nearly closed conductive ring member, a first end of said ring having a conductive extension in the form of a leg joining said first end at substantially a right angle to the plane of said ring, a conductive plane member attached to the outer end of said leg and lying parallel to the plane of said ring, capacitance means connected between the second end of said ring and said conductive plane member, and connecting means on said ring a short distance from said first end for attaching one conductor of a transmission line thereto.

6. Apparatus in accordance with claim 5 wherein said conductive plane member is a least as large as said ring member, and including a transmission line having one conductor connected to said connecting means on said ring and another conductor connected to said conductive plane member.

7. An antenna comprising a plurality of nearly closed, concentric conductive coplanar ring members positioned nearly adjacent to each other, a first end of each said ring having a conductive extension leg joining said first end at substantially a right angle to the plane of said rings, conductive means connected between the outer ends of said legs, a separate input lead connected at one end to each said ring a short distance from said first end, the other ends of said leads connected together at a common junction and adapted to be connected to one side of a transmission line, and separate capacitance means connected from the second end of each of said rings to said conductive connecting means.

8. Apparatus in accordance with claim 7 wherein each of said capacitance means has a different value for tuning the antenna to an increased bandspread.

9. Apparatus in accordance with claim 8 wherein each of said input leads is connected to its respective ring at a different distance from said ring first end for correct impedance matching to a transmission line.

10. An antenna comprising a plurality of poles erected in a ring shape on the earth, a multiplicity of conductors supported parallel to the earth by said poles and insulated therefrom, said conductors being coplanar, concentric, and forming a plurality of nearly closed similar polygons having a gap at a common circumferential position, a first end of each of said conductors having a conductive leg connected thereto and extending downwardly and connected to the earth, capacitance means connected between the second ends of said conductors and the earth, an input connection on each of said conductors at a short distance from said first end, a separate down lead connected at one end to each said input connection, and the other ends of said down leads connected to each other at a common junction adapted to be connected to one side of a transmission line.

11. Apparatus in accordance with claim 10 wherein a system of ground conductors is provided substantially at earth level, said system comprising a plurality of radial ground conductors centered under the center of said antenna, and a plurality of bridging ground conductors connected to said radial conductors at points forming vertices of similar polygons concentric with said radial ground conductors.

12. In an antenna system for sending and receiving vertically polarized radio waves, a plurality of circular, hollow conductive ring members elevated from and disposed parallel to a substantially horizontal conductive plane, one, first, extremity of each of said ring members directed substantially normal to and individually terminated conductively in said conductive plane, the opposite extremity of each said member terminating in the plane of said ring members and being isolated from said first extremity, said ring members containing internal coaxially disposed conductive tuning members isolated therefrom, said tuning members emerging from said opposite extremities respectively and being directed normal to and terminating in said conductive plane whereby the optimum current distribution may be established, a normally disposed conductive input member connected at one end to each said ring member at a specified distance from the first extremity thereof, a coaxial transmission line having its inner conductor connected to a common junction of the other ends of said input members, said elevated plurality of ring members being supported and aligned parallel to said conductive plane by non-conductive supports.

13. An antenna system comprising a nearly closed conductive ring member, a first end of said ring having a conductive extension leg joining said first end at a right angle to the plane of said ring, means for connecting the outer end of said leg to one side of a transmission line, continuously variable capacitance means having one side thereof connected to the second end of said ring, the other side of said capacitance means conductively connected to the outer end of said leg, remote control means connected to said variable capacitance means for adjusting the capacitance thereof, a first input connection at a first point on said ring member a predetermined distance from said first ring end, a second input connection at a second point on said ring member a different predetermined distance from said first ring end, coaxial switch means having two output connections and one input connection, means connecting one of said output connections to said first ring member input connection, means connecting the second output connection to said second ring member input connection, and means for connecting said switching means input connection to the other side of the transmission line.

14. An antenna comprising a plurality of pairs of nearly closed concentric coplanar conductive ring members, a first end of each said ring having a conductive extension leg joining said first end at substantially a right angle to the plane of said rings, conductive means connecting the outer ends of said legs together, a multiple pole switch having each respective pole connected to a different pair of said ring members at the second end thereof, a first plurality of capacitors connected at one end to one operating switch contact at each respective pole of said switch, a second plurality of capacitors connected at one end to another operating switch contact at each said switch pole, said second plurality of capacitors being of different values than said first plurality of capacitors, the other ends of all said capacitors connected to the outer ends of said legs, operating means connected to said switch for switching each pair of ring members to a different one of said capacitors, a separate input lead connected to each of said ring members at a predetermined respective distance from said first end thereof, said input leads being connected together at a common junction adapted to be connected with one side of a transmission line.

15. Apparatus in accordance with claim 14 wherein said antenna is positioned parallel to a conductive plane connected conductively to said outer ends of said legs, wherein a coaxial transmission line has its inner conductor connected to the common junction of said input leads and its outer conductive sheath connected to said conductive plane.

16. Apparatus in accordance with claim 1 wherein the diameter of said ring member is from .01 to .075 times the operating wavelength of said antenna.

17. Apparatus in accordance with claim 1 wherein the length of said leg is from .001 to .125 times the operating wavelength of said antenna.

18. An antenna comprising a pair of parallel coaxial nearly closed conductive ring members of equal diameter, conductive shorting means connected directly between respective first ends of said rings, capacitance means connected between respective second ends of said rings, and a transmission line feed point on each said ring at equal distances from said first ends.

*19. An antenna comprising a nearly closed conductive ring member, a first end of said ring having a conductive extension in the form of a leg joining said first end at substantially a right angle to the plane of said ring, means for connecting the outer end of said leg to one conductor of a transmission line, and connecting means on said antenna a short distance from the junction of said leg with said ring member for attaching to the other conductor of the transmission line.*

*20. Apparatus in accordance with claim 19 including tuning means operatively connected to said ring member.*

*21. Apparatus in accordance with claim 19 wherein said ring member is substantially horizontal, and including a substantially conductive plane member which is conductively connected to the outer end of said leg parallel to said ring member.*

*22. An antenna arrangement comprising a plurality of closely adjacent conductive members, each said member consisting of an open planar ring having an extension leg connected to a first end thereof at substantially a right angle to the plane of said ring, and the other end of said open ring spaced from said first end, said rings being substantially concentric; conductive means connected between the outer ends of all said legs; and a plurality of input leads connected respectively to said members near the junction of said ring and leg of each said member.*

References Cited by the Examiner

The following references, cited by the Examiner, are of record in the patented file of this patent or the original patent.

UNITED STATES PATENTS

| | | | |
|---|---|---|---|
| 2,297,427 | 9/1942 | Neidhardt | 343—866 X |
| 2,405,123 | 8/1946 | Flyer | 343—742 |
| 2,431,124 | 11/1947 | Kees et al. | |
| 2,501,778 | 3/1950 | Lindenblad | 343—732 |
| 2,578,154 | 11/1951 | Shanklin. | |
| 2,615,134 | 10/1952 | Carter | 343—848 X |
| 2,755,465 | 7/1956 | Ramsay | 343—741 X |
| 2,996,713 | 8/1961 | Boyer | 343—745 |
| 3,078,462 | 2/1963 | Herman | 343—733 |
| 3,202,995 | 8/1965 | Schultz | 343—732 |
| 3,247,515 | 4/1966 | Boyer | 343—774 X |

OTHER REFERENCES

Noll et al.: Television and FM Antenna Guide, page 84, The Macmillan Co., New York, copyright 1951.

ELI LIEBERMAN, *Primary Examiner.*

HERMAN KARL SAALBACH, *Examiner.*

R. F. HUNT, *Assistant Examiner.*